US012546467B2

(12) United States Patent
Park

(10) Patent No.: US 12,546,467 B2
(45) Date of Patent: Feb. 10, 2026

(54) DOORS FOR HOME APPLIANCE AND APPLIANCE INCLUDING THE SAME HAVING A PANEL EDGE PORTION WITH PRINTED LAYERS SURROUNDING A WINDOW PERIMETER

(71) Applicant: LG ELECTRONICS INC., Seoul (KR)

(72) Inventor: Beom Hyeon Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 19/058,162

(22) Filed: Feb. 20, 2025

(65) Prior Publication Data

US 2025/0271129 A1 Aug. 28, 2025

(30) Foreign Application Priority Data

Feb. 23, 2024 (KR) ........................ 10-2024-0026828

(51) Int. Cl.
*F24C 15/04* (2006.01)
*F21V 9/40* (2018.01)
*F21V 33/00* (2006.01)
*F24C 15/00* (2006.01)

(52) U.S. Cl.
CPC ............ *F21V 33/0044* (2013.01); *F21V 9/40* (2018.02); *F24C 15/008* (2013.01); *F24C 15/04* (2013.01)

(58) Field of Classification Search
CPC ..... F21V 33/0044; F24C 15/04; F24C 15/008
See application file for complete search history.

(56) References Cited

U.S. PATENT DOCUMENTS 7,157,667 B2 1/2007 Gramlich et al.
9,046,294 B2 * 6/2015 Lee ........................ A47F 3/0434
2018/0222794 A1 8/2018 Henn et al.

FOREIGN PATENT DOCUMENTS

EP 4179947 A1 * 5/2023 ........... G02B 6/0073
FR 3121928 10/2022
WO WO 2017/216483 12/2017
WO WO 2018/122515 7/2018
WO WO 2020/091233 5/2020

OTHER PUBLICATIONS

European Search Report dated Jun. 16, 2025 issued in Application No. 25159527.8.

* cited by examiner

*Primary Examiner* — Robert J May
(74) *Attorney, Agent, or Firm* — KED & ASSOCIATES

(57) ABSTRACT

A door for a home appliance and a home appliance including the same are provided. The door includes a door body in front of a storage space, and a door panel coupled to the door body. The door panel includes a window, and a panel edge unit having a printed layer. The printed layer includes a first printed layer and a second printed layer. The second printed layer extends further toward a window's central portion than the first printed layer to cover an inner edge of the first printed layer. When an edge of the second printed layer covers the inner edge, the plurality of printed layers is formed at a boundary of the panel edge unit to decrease a light transmittance, implementing an even light transmittance.

20 Claims, 12 Drawing Sheets

(A)

(B)

DOORS FOR HOME APPLIANCE AND APPLIANCE INCLUDING THE SAME HAVING A PANEL EDGE PORTION WITH PRINTED LAYERS SURROUNDING A WINDOW PERIMETER

CROSS REFERENCE TO RELATED APPLICATION

The present application claims priority to Korean Patent Application No. 10-2024-0026828, filed Feb. 23, 2024, the entire contents of which are incorporated herein for all purposes by this reference.

BACKGROUND OF THE INVENTION

Field of the Invention

The present disclosure relates to a door for a home appliance and a home appliance including the same.

Description of the Related Art

Home appliances storing target objects therein and including doors, such as a cooking appliance, a refrigerator, a clothing treatment apparatus, etc., are widely used. Such home appliances may include storage spaces to store target objects in cabinets creating the external appearance thereof, and doors to open and close the storage spaces.

Recently, a window may be formed in a door of a home appliance so that a user can observe a stored object in the storage space when the door is closed. The home appliance may include a separate light that illuminates the storage space for the user to observe easily the stored object.

At this point, some of light emitted from the light that illuminates the storage space may be reflected on an inner wall of the storage space and transmitted to the user through the window of the door. Since the forward-transmitted light may expose components provided in the rear of the door, a non-transmission layer may be printed on a perimeter surface of the window. The non-transmission layer may be composed of a plurality of printed layers to provide various colors. For example, the non-transmission layer may be printed in a 2-color printing method.

However, errors occurring in the printing process may cause the plurality of printed layers not to be precisely printed in an equal size and position. Specifically, since the plurality of printed layers is printed at specific time intervals to allow for drying between them, it is difficult to print the printed layers to perfectly match edge portions of the printed layers. When the boundaries of the plurality of printed layers that constitute the non-transmission layer are not perfectly aligned, some light is transmitted through the boundaries, which ruins the aesthetic of the door. In other words, light is transmitted through a portion of the boundaries of the printed layers where the printed layers are not aligned, and the aesthetic of the door is not unified.

To further increase the illumination of the storage space, the home appliance may be equipped with LED lights installed toward the storage space. The higher the illumination of the storage space, the higher the risk of ruining the aesthetics of the door because some of light may leak through the boundary portion of the non-transmission layer surrounding the window of the door.

On the other hand, the door may have properties that allow light from the outside space to be transmitted. The light transmitted through the door may also be transmitted to optical components inside the door or inside the home appliance, causing the optical components to obtain an inaccurate image.

SUMMARY OF THE INVENTION

The present disclosure is provided to solve the above-described problems of the related art, an objective of the present disclosure is to prevent light in a home appliance from leaking outward through a boundary of a plurality of printed layers formed in a door of a home appliance, or improve the light transmittance uniformity of the entire boundary.

Another objective of the present disclosure is to prevent light from leaking through a boundary of a plurality of printed layers even when errors occur in a process of printing the plurality of printed layers.

Yet another objective of the present disclosure is to differentiate light transmittances of a window and a perimeter based on a boundary of the window and the perimeter around the window.

Still another objective of the present disclosure is to improve the light transmission uniformity at a boundary of a printed layer formed in a door for a home appliance without a separate additional structure or device.

Still another objective of the present disclosure is to prevent external light from being transmitted to an optical device (camera device) in a door for a home appliance by reflecting the external light on a surface of the door.

According to features of the present disclosure to achieve the above-described objectives, a door for a home appliance of the present disclosure may include a door body disposed in front of a storage space of the home appliance, and a door panel coupled to the door body. The door panel may include a window through which light of the storage space is transmitted, and a panel edge unit having a printed layer formed on a surface around the window. The printed layer may include a first printed layer formed on a surface of the door panel, and a second printed layer stacked on the first printed layer. At this point, the second printed layer may extend further toward a central portion of the window than the first printed layer to cover an inner edge of the first printed layer. As described above, when an edge of the second printed layer covers the inner edge of the first printed layer, a plurality of printed layers is formed at a boundary of the panel edge unit to reduce the light transmittance.

The first printed layer and the second printed layer may be respectively formed by printing materials having different light transmittances on the surface of the door panel.

The second printed layer may be printed by a material with a lower light transmittance than a light transmittance of the first printed layer.

The thickness of the second printed layer may be formed thicker than the thickness of the first printed layer.

The panel edge unit may be provided on a rear surface of the door panel, the surface facing the storage space.

A surface vacuum-evaporation layer may be provided on the surface of the door panel and stacked on both the panel edge unit and the window. The surface vacuum-evaporation layer may be formed by vacuum-vaporizing a metal material on the surface of the door panel.

An edge of the second printed layer may include an extending end part that further protrudes in a direction toward the central portion of the window than an edge of the first printed layer.

The extending end part may be continuously formed around the edge of the window.

A width of the extending end part extending in a direction toward the central portion of the window may range from 0.3 mm to 1.5 mm.

One or more additional printed layers may be provided between the first printed layer and the second printed layer. An inner edge of the second printed layer may cover both an inner edge of the first printed layer and an inner edge of the additional printed layer.

An electronic component unit may be disposed in the second printed layer.

The electronic component unit may include a lighting device that emits light in a direction where the first printed layer and the second printed layer are stacked together.

The panel edge unit may be formed continuously around the edge of the window.

As described above, according to the present disclosure, the door for a home appliance and the home appliance including the same have the following effects.

In the present disclosure, the panel edge unit surrounding the window of the door may include the first printed layer and the second printed layer. At this point, the second printed layer may be stacked on the upper portion of the first printed layer and printed to cover the inner edge of the first printed layer. When the edge of the second printed layer covers the inner edge of the first printed layer, the plurality of printed layers may be formed at the boundary of the panel edge unit. Accordingly, a light transmittance of the boundary of the plurality of printed layers is lowered like the remaining portion of the panel edge unit, and an even light transmittance is implemented, so that the aesthetic of the door can be increased.

In addition, in the present disclosure, since the boundary of the panel edge unit is covered by the second printed layer having a relatively low light transmittance, it is possible to prevent light in the home appliance from leaking through the boundary. When light does not leak through the boundary, the panel edge unit and the window are classified clearly from each other, the aesthetic of the door can be increased, and the quality of the home appliance can be increased.

Furthermore, in the present disclosure, since the boundary of the panel edge unit is covered by the edge portion of the second printed layer, even when errors occur in the printing process of the plurality of printed layers, it is possible to prevent the printed layer of the boundary from becoming thinner. Accordingly, the light transmittance uniformity at the boundary of the panel edge unit can be improved.

Furthermore, in the present disclosure, light leakage at the boundary can be prevented by printing the edge portions of the two printed layers differently from each other. Accordingly, in the present disclosure, without a separate additional structure or device, the light transmittance uniformity at the boundary of the plurality of printed layers formed in the door can be improved.

Furthermore, in the present disclosure, the color of the second printed layer is selected as a relatively darker color than the color of the first printed layer, and even though a strong light is installed in the home appliance, light leakage at the boundary of the panel edge unit and the window can be prevented.

Specifically, even when the lighting device disposed at the panel edge unit emits light toward the storage space and the light reflected on the inner wall of the storage space is transmitted to the surface of the door, the extending end part extending from the edge of the second printed layer can block the transmitted light. Therefore, the door can provide the unified aesthetic.

In addition, in the present disclosure, even when 3 layers or more printed layers are provided to form the panel edge unit, the uppermost printed layer can cover the inner edges of the remaining printed layers to prevent light leakage. Therefore, even when a 3-color or more printing method is used in the surface of the door, a light transmittance at the boundary can be formed evenly.

Furthermore, in the present disclosure, the surface vacuum-evaporation layer may prevent external light from being transmitted to the internal space of the door and allow the light to be reflected on the surface vacuum-evaporation layer. This can prevent the external light from being transmitted to the internal space of the door, reflected on the rear panel, and then transmitted to the camera device. Therefore, it is possible to prevent the camera device from not obtaining an accurate image due to interference with light introduced from the outside space. Furthermore, since the surface vacuum-evaporation layer can block external light, the surface vacuum-evaporation layer also prevents the image obtained by the camera device from getting light smearing or flaring. Accordingly, the image quality of the camera device can be improved.

Furthermore, the surface vacuum-evaporation layer can prevent the figure of the user located in front of the home appliance from being projected into the door and photographed by the camera device. Therefore, the door of the present disclosure can protect the user's privacy.

DETAILED DESCRIPTION OF THE DISCLOSURE

Figure 1:
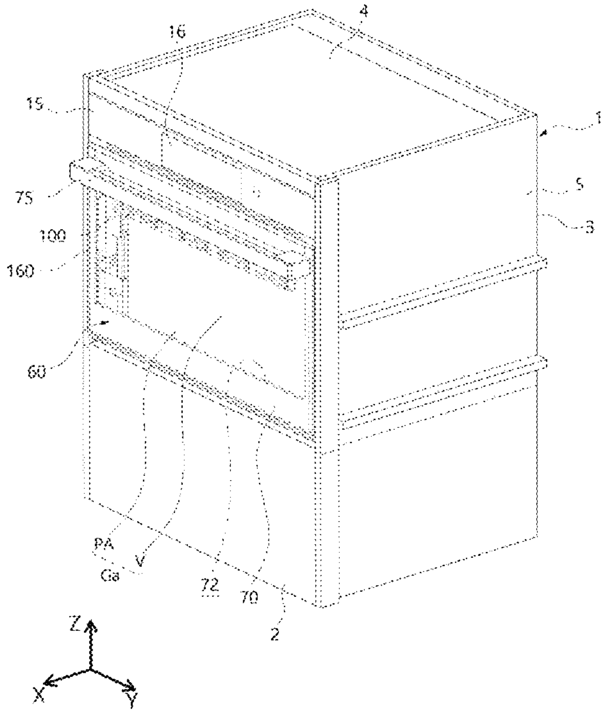
FIG. 1 is a perspective view showing a home appliance according to an embodiment of the present disclosure.

Hereinafter, exemplary embodiments of the present disclosure will be described in detail with reference to the illustrative drawings. Wherever possible, the same reference numerals will be used throughout the drawings and the description to refer to the same or like elements or parts. Furthermore, it is to be noted that, when the detailed description of the functions and configuration of conventional elements related to the present disclosure may make the gist of the present disclosure unclear, a detailed description of those elements will be omitted.

The present disclosure relates to a home appliance, and a door for a home appliance (hereinbelow, which refers to a "door 60"). At this point, the home appliance may be a home appliance in which a storage space 41 is provided. The door 60 may be disposed in front of the storage space 41. At this point, the front means a direction that a user faces when the user is located in front of the home appliance. Referring to FIG. 1, the X-axial direction may be a direction toward the front side. The Y-axial direction may be a left-right width direction of the door 60. The Z-axial direction may be an upper-bottom width direction that is a height direction of the door 60. Hereinbelow, the present disclosure will be described based on the directions.

The door 60 for a home appliance may be applied to the door 60 of a home appliance such as a cooking appliance, a refrigerator, a freezer, a kimchi refrigerator, a plant cultivating apparatus, a clothing care machine, a washing machine, a drying machine, etc., and also be applied to doors of furniture or an entrance door. The present disclosure may be applied to various home appliances equipped with one door 60 or a plurality of doors 60. Various home appliances may include a closed cooking appliance such as an oven, a microwave, etc. Hereinbelow, a door 60 of the present disclosure applied to a cooking appliance will be described as an example.

In the embodiment, electronic component may be disposed inside the door 60. The electronic component may impart various functions to the door 60. For example, when the electronic component is an electronic component unit 100, the electronic component unit 100 may obtain an image inside the storage space 41. The door 60 may increase the inner illuminance of the storage space 41. To this end, the electronic component unit 100 may include an image-sensing device 120 and a lighting device 130.

Figure 7:
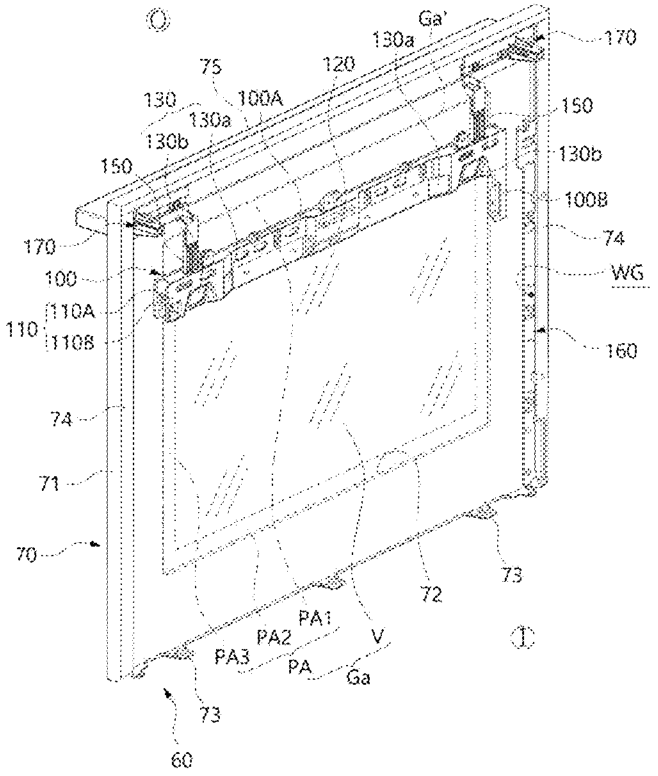
FIG. 7 is a perspective view showing the rear frame and an inner frame exploded, which constitute the door for a home appliance according to the embodiment of the present disclosure.

For reference, in FIG. 7, the lighting device 130 is disposed at opposite portions with the image-sensing device 120 located between the opposite lighting devices. The lighting device 130 may include a plurality of lights 130*a* and 130*b*. At this point, the plurality of lights 130*a* and 130*b* may emit a light in different directions.

As another example, a display device (not shown) may be disposed in the door 60, as an electronic component. The display device may provide information about the home appliance to a user. The user can input an operation order through the display device.

The electronic component unit 100 or a part of the display device may be provided in the door 60. At this point, the electronic component such as the electronic component unit 100, the display device, or the like may transmit or receive an electrical signal with a main control unit provided in a home appliance main body 10 (referring to FIG. 2), or be connected to the main body 10 with a wire for power supply. Hereinbelow, the electronic component unit 100 will be described as an example of the electronic component disposed in the door 60.

For reference, FIG. 1 shows the electronic component unit 100 and a harness guide 160 supplying power to the electronic component unit 100 through a front panel Ga constituting a front surface of the door 60. Practically, the electronic component unit 100 and the harness guide 160 are disposed in the door 60, so the electronic component unit 100 and the harness guide 160 are not exposed from the front space of the door 60. Referring to FIG. 7, a wire storage WG may be provided inside of the harness guide 160 to store the wire harness (not shown).

In the embodiment, the home appliance may be a built-in home appliance. For example, the home appliance may be a cooking appliance installed in a built-in method. In FIG. 1, the cooking appliance of the embodiment may be installed in a kitchen fitting 1, etc., and the front surface of the cooking appliance may be exposed outward. At this point, the front surface of the cooking appliance may include the door 60 and an operating part 15. Reference numeral 16 is a display unit exposed from a front surface of the operating part 15. The electronic component unit 100 described above and the guide device 200 may be disposed in the door 60.

In FIG. 1, the kitchen fitting 1 may include a lower structure 2, a rear surface part 3, an upper surface part 4, and a side surface part 5. The home appliance may be enclosed with the lower structure 2, the rear surface part 3, the upper surface part 4, and the side surface part 5, and may be exposed only at the front surface forward. Since the area where the home appliance is exposed forward is small, the maintenance of the electronic component should be performed in a small space.

Figure 2:
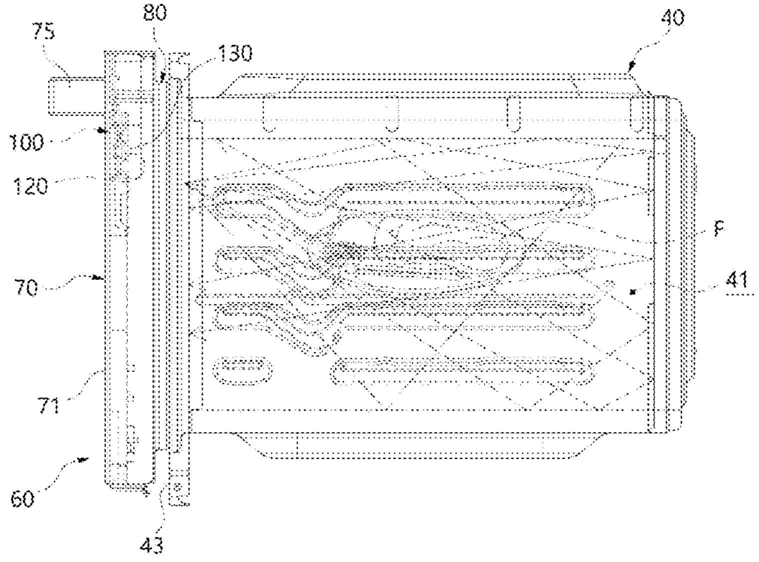
FIG. 2 is a side view projecting and showing a storage space constituting the embodiment of the present disclosure.

FIG. 2 is a side view showing the embodiment of the present disclosure. For reference, in FIG. 2, the storage space 41 formed in an inner casing 40 of the home appliance is shown in a projected view. The inner casing 40 may be provided in the main body 10. The inner casing 40 may be enclosed with the side cover 12 of the main body 10, etc.

A food F (referring to FIG. 2) may be disposed in the storage space 41. The food F may not be visible from the outside space, i.e., from the front space of the door 60. In the embodiment, since the door 60 includes a window V, the user can observe the inside part of the storage space 41 through the window V. However, when the illuminance of the storage space 41 is low, it is difficult for the user to observe the inside part of the storage space 41 accurately with the naked eye. In the embodiment, since the electronic component includes the lighting device 130, the illuminance of the storage space 41 can be sufficiently increased.

In FIG. 2, dotted lines indicate paths in which the lighting device 130 emits light. As shown in the drawing, the light emitted from the lighting device 130 may be reflected on an inner wall of the storage space 41 to illuminate the storage space 41 evenly. A part of the light emitted from the lighting device 130 may be transmitted to the image-sensing device 120 constituting the electronic component after being reflected on the inner wall of the storage space 41.

At this point, the light emitted from the lighting device 130 may be reflected on an inner wall of the storage space 41 and then transmitted to the door 60. As described above, the light transmitted to the door 60 may expose components disposed in the rear of the door 60 in a direction toward the user. In the embodiment, the door 60 includes a panel edge unit PA that is formed around the perimeter of the window V to prevent exposure of the components. The panel edge unit PA may be formed to be opaque or translucent around the window V. A structure of the panel edge unit PA will be described in detail below.

Figure 3:
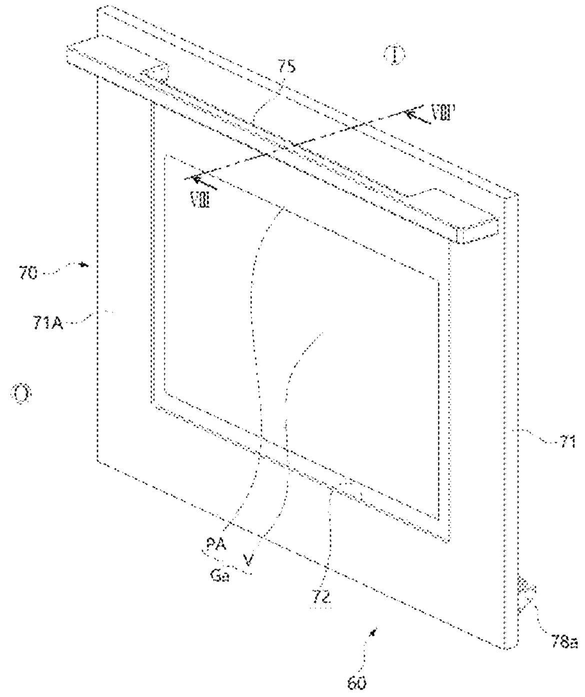
FIG. 3 is a perspective view showing a door for a home appliance according to the embodiment of the present disclosure.
Figure 4:
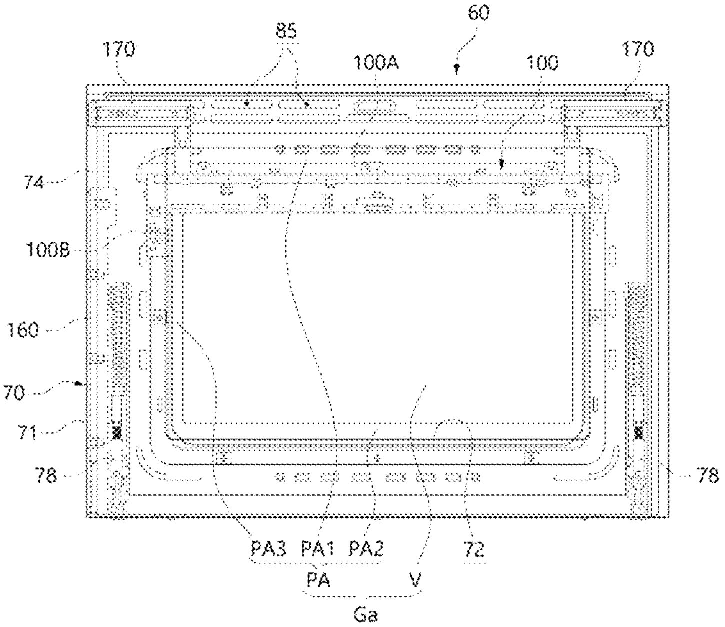
FIG. 4 is a front view showing the door for a home appliance according to the embodiment of the present disclosure.

In FIGS. 3 and 4, the door 60 according to the embodiment of the present disclosure is illustrated. For reference, in the drawings, the reference numeral "I" indicates the inside space of the door 60, i.e., a direction toward the storage space 41, and the reference numeral "O" indicates the outside space of the door 60, i.e., the outside space of the home appliance.

The front surface of the door 60 may consist of a front frame 70 to be described below, the front panel Ga, and a door handle 75. The front panel Ga and the door handle 75 may be coupled to the front frame 70. At this point, the front panel Ga may be made of a transparent or translucent material to allow the storage space 41 to be visible. Only a partial region of the front panel Ga may be visible in a front-rear direction. In the embodiment, the window V is formed at a central portion of the front panel Ga, and a printed region may be formed on an outer portion of the window V. The printed region may become the above-described panel edge unit PA, and the panel edge unit PA may prevent the door 60 from being visible in the front-rear direction or allow very small amount of light to be transmitted through the door.

The door handle 75 is provided on the front surface of the door 60. The door handle 75 is a portion gripped by the user when the user opens the door 60. In the embodiment, the door 60 may be operated in a kind of pull-down method in which an upper end of the door turns on a lower end vertically. The user can grip and pull the door handle 75 to open the door 60 downward. As another example, the door 60 may be operated in a side-swing method to be opened sideways.

Figure 6:
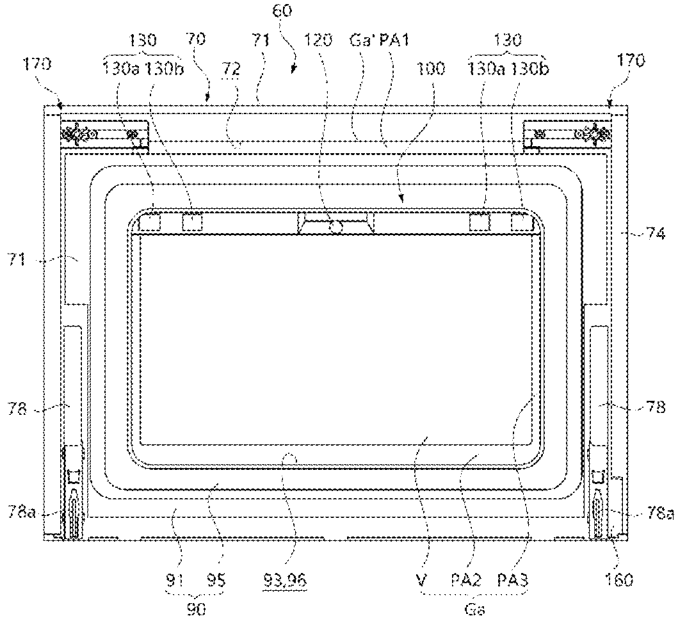
FIG. 6 is a rear view showing an exploded rear frame that constitutes the door for a home appliance according to the embodiment of the present disclosure.

FIG. 6 is a front view showing the door 60. The window V is formed in a central portion of the door 60. The window V is provided for the storage space 41 to be visible. The window V may be formed in a central portion of the door panel G. More specifically, the door panel G includes a plurality of panels Ga, Gb, and Gc, and the window V may be formed in each central portion of the plurality of panels Ga, Gb, and Gc. The door panel G may be made of a material such as glass that can transmit light.

In the embodiment, among the plurality of panels Ga, Gb, and Gc, the front panel Ga may include a panel edge unit PA surrounding the perimeter of the window V, and the panel edge unit PA prevents the storage space 41 from being visible. In FIG. 4, the panel edge unit PA may include an upper edge part PA1 covering an upper perimeter of the window V, a lower edge part PA2 covering a lower perimeter of the window V, and side edge parts PA3 covering opposite edges of the window V. The upper edge part PA1, the lower edge part PA2, and the side edge parts PA3 may be connected to each other and form a rough rectangular shape.

The panel edge unit PA may prevent exposure of the components disposed behind the front panel Ga. For example, the panel edge unit PA may cover the inner frame 90 to be described below, and the electronic component unit 100. In the embodiment, the electronic component unit 100 is disposed behind the upper edge part PA1. FIG. 4 projects and shows the electronic component unit 100 covered by the panel edge unit PA, but practically, the panel edge unit PA covers the electronic component unit 100. The panel edge unit PA covers the components and may improve the aesthetic of the door 60 while being printed in specific colors or shapes. A structure and a manufacturing method of the panel edge unit PA will be described below.

A front opening 72 may be formed in a central portion of the front frame 70. The front opening 72 may be formed through the central portion of the front frame 70 and expose a part of the front panel Ga. The front opening 72 may expose the window V and a part of the panel edge unit PA.

Figure 5:
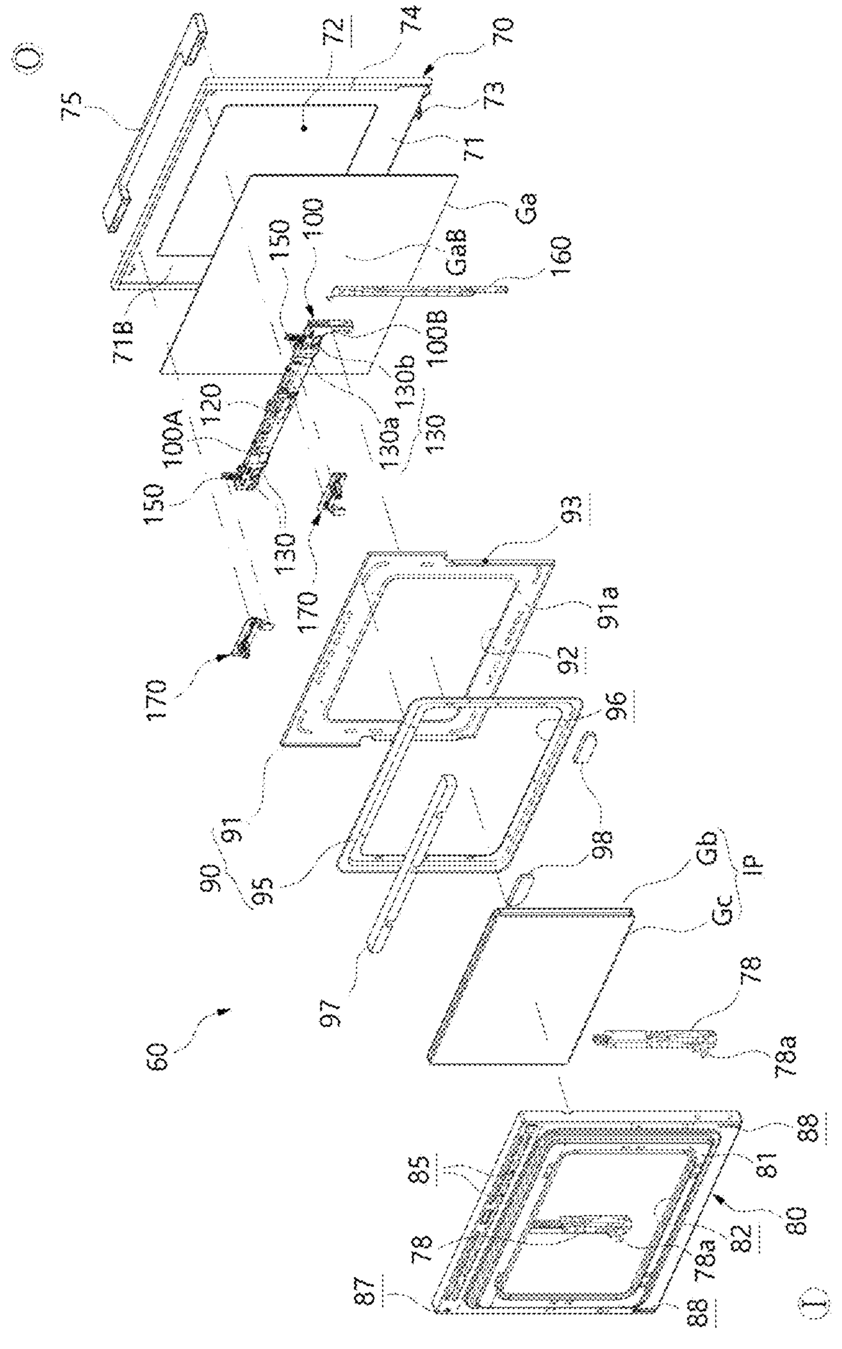
FIG. 5 is an exploded-perspective view showing components constituting the door for a home appliance according to the present disclosure.

Referring to FIGS. 5 and 6, parts constituting the embodiment will be described in detail. The door body 70, 80, 90 constituting the frame of the door 60 may include a plurality of frame parts. In the embodiment, the door body 70, 80, 90 may include the front frame 70, the rear frame 80, and the inner frame 90. The frame parts are coupled to each other to form the single door body 70, 80, 90. At this point, the term "front" may be based on the front side of the door 60 (right side based on FIG. 5).

The front frame 70 may be disposed in a front portion of the door body 70, 80, 90. More specifically, the front frame 70 may form a front frame of the door body 70, 80, 90. The front frame 70 includes a front frame body 71 of approximately a rectangular shape. The front opening 72 may be formed through a central portion of the front frame body 71 and expose the door panel G. A front bracket 73 protrudes from a lower end of the front frame body 71, and the front bracket 73 may be coupled to a rear bracket 83 of the rear frame 80 which will be described below. The reference numeral 74 is a side cover, and the harness guide 160 may be stored in the side cover 74.

Among opposite surfaces of the front frame 70, the front panel Ga may be located in close contact with a rear surface 71B of the front frame 70. Since the perimeter of the front frame 70 is wider than the perimeter of the front panel Ga, even when the front panel Ga is provided in close contact with the rear surface 71B of the front frame 70, the rear surface 71B of the front frame 70 may include an installation region that is not covered with the front panel Ga. The installation region IA may be formed on a surface of the door body 70, 80, 90 outside the edge of the door panel G.

The door body 70, 80, 90 may include a door hinge 78. FIG. 5 shows the door hinge 78 disassembled. FIG. 6 shows the door hinge 78 disposed between the front frame 70 and the inner frame 90. A hinge holding arm 78 may protrude on the door hinge 78.

The rear frame 80 may be coupled to the front frame 70 with the door panel G located between the rear frame 80 and the front frame 70. The rear frame 80 may include a rear frame body 81 formed in approximately a rectangular frame. When the door 60 is closed, the rear frame 80 may face an entrance of the storage space 41. A rear opening 82 may be formed in a central portion of the rear frame body 81. The rear opening 82 may have a structure that is open forward and rearward so that the inside part of the storage space 41 is visible through the window V. The reference numeral 88 indicates a holding arm-passing hole through which the hinge holding arm 78 protrudes. The rear frame 80 may include a rear fastening hole 87. The rear fastening hole 87 may be a portion through which the door fastener (not shown) passes.

The cooling channel 85 may be formed in the rear frame 80. Air flowing into the door 60 through the cooling channel may be transferred to the main body 10 of the cooking appliance and perform a cooling function. On the other hand, heat in the main body 10 of the cooking appliance may flow into the cooling channel 85 and then pass inside the door 60 to be discharged to the outside space.

The rear opening 82 of the rear frame 80 does not cover the window V, but may cover a part of the electronic component unit 100. More specifically, as shown in FIG. 6, through the rear opening 82, the image-sensing device 120 and the lighting device 130 that constitute the electronic component unit 100 are exposed in a direction toward the storage space 41 (based on a closed state), but a portion of the electronic component unit 100, which corresponds a portion above the image-sensing device 120 and the lighting device 130, may be covered by the rear frame 80. Accordingly, even when the user opens the door 60, the remaining portion excluding the image-sensing device 120 and the lighting device 130 may not be exposed through the window V.

The inner frame 90 may be coupled to the rear frame 80. The inner frame 90 may be disposed between the rear frame 80 and the front frame 70. The rear panel IP may be disposed between the inner frame 90 and the rear frame 80. An insulator 97, 98 may be disposed between the inner frame 90 and the rear frame 80. When the inner frame 90 is coupled to the rear frame 80, the rear panel IP and the insulator may be fixed.

In the embodiment, the inner frame 90 includes a first inner frame 91 and a second inner frame 95. A first inner opening 92 and a second inner opening 96 may be formed in the central portion of the first inner frame 91 and the central portion of the second inner frame 95. The first inner opening 92 and the second inner opening 96 may be connected to the rear opening 82 to expose the window V. A hinge-avoiding part 93 may be formed on each side surface of the first inner frame 91 in a recessed shape. The hinge-avoiding part 93 may have a recessed shape to avoid a portion where the door hinge 78 is mounted. As another example, the inner frame 90 may be omitted or provided as a part of the rear frame 80.

The insulator 97, 98 may be disposed between the inner frame 90 and the rear frame 80. The insulator 97, 98 may be disposed at each of upper and lower ends of the rear panel IP, and perform an insulating function.

The first rear panel Gb and the second rear panel Gc constituting the rear panel IP may be spaced apart from the front panel Ga. A gap between the rear panel IP and the front panel Ga spaced as described above may be a flow space A (referring to FIG. 8) where air flows. Furthermore, the rear panel IP may have an insulation space therein to prevent heat in the storage space 41 from being transmitted forward, i.e., toward the door 60. Therefore, the rear panel IP may be considered as an insulation panel. As another example, the rear panel IP may consist of a single panel or of three or more panels.

FIG. 7 shows a rear structure of the door 60 without the inner frame 90 and the rear frame 80. As described above, the electronic component unit 100 may be disposed at the front panel Ga. In the embodiment, the electronic component unit 100 may be located in close contact with the front panel Ga. As another example, the electronic component unit 100 may be spaced apart from the front panel Ga.

The electronic component unit 100 may include two casings 110. The image-sensing device 120 and the lighting device 130 may be provided between the two casings 110A and 110B. The image-sensing device 120 may be considered as a kind of camera device to photograph the storage space 41. The lighting device 130 is provided to emit a light into the storage space 41, and may include an LED device. In the embodiment, the electronic component unit 100 includes both the image-sensing device 120 and the lighting device 130. As another example, the electronic component unit 100 may include the image-sensing device 120 or the lighting device 130.

The electronic component unit 100 may include a main unit 100A and a connection unit 100B. The image-sensing device 120 and the lighting device 130 may be disposed in the main unit 100A. A wire harness may be disposed in the connection unit 100B to supply power and transmit signals to the image-sensing device 120 and the lighting device 130. In the embodiment, the main unit 100A and the connection unit 100B may extend in different directions respectively. As another example, the connection unit 100B may be omitted.

Figure 9:
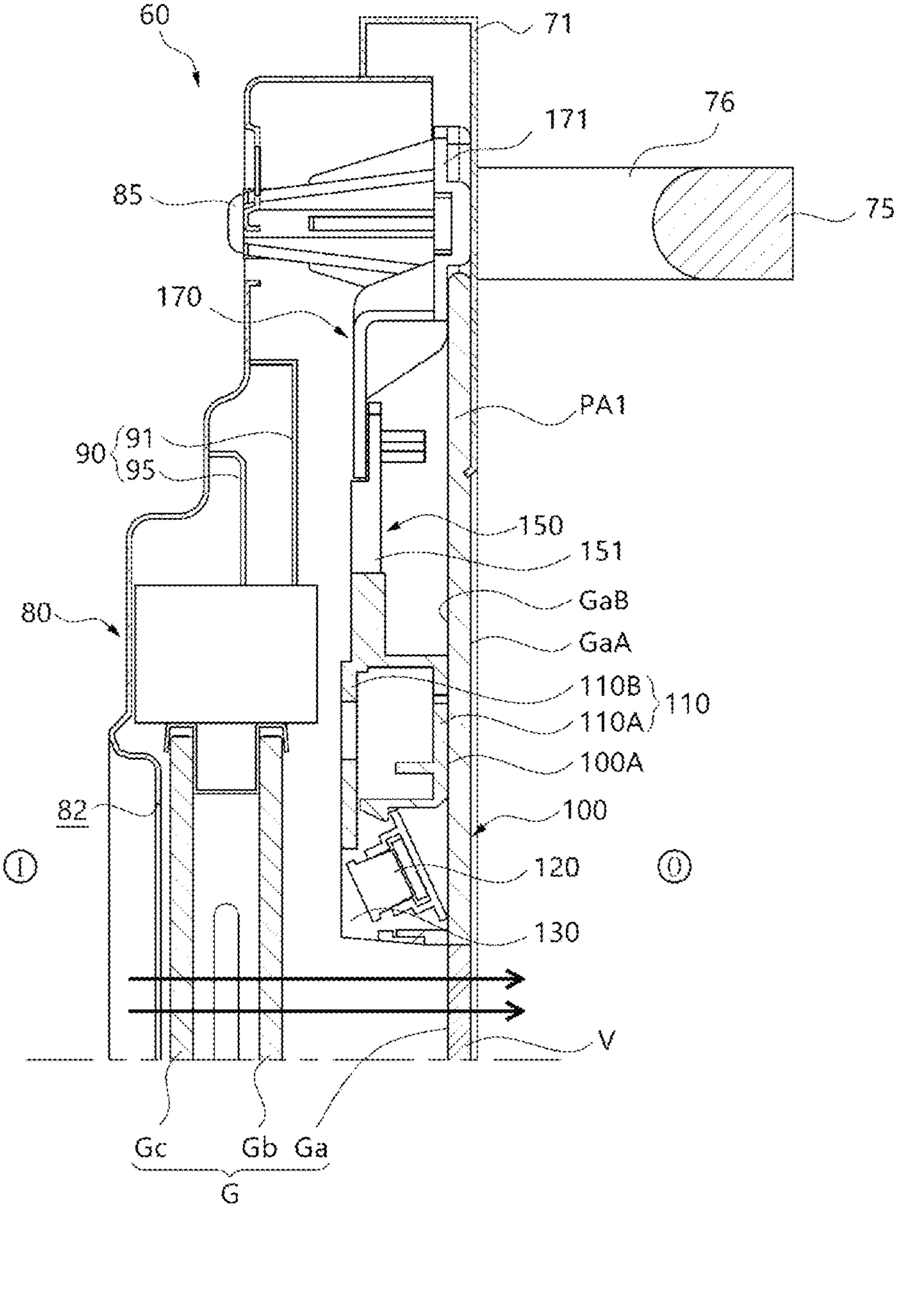
FIG. 9 is a sectional view enlarging and showing an upper portion of FIG. 8.

The electronic component unit 100 may be disposed at a position that is spaced further toward the window V than the edge Ga' of the front panel Ga. As shown in FIG. 9, the electronic component unit 100 may be located at a position that is spaced from an upper edge of the edge Ga' of the front panel Ga, toward the central portion V' of the window V (referring to FIG. 10). Then, the electronic component unit 100 may be disposed closer to the window V to secure wider view angle and emission angle.

The electronic component unit 100 may be disposed at the panel edge unit PA. The panel edge unit PA may be provided around the perimeter of the window V. The electronic component unit 100 disposed at the panel edge unit PA may be covered by the panel edge unit PA, which prevents the electronic component unit 100 from being exposed forward, i.e., toward the user. In the embodiment, in the panel edge unit PA, the electronic component unit 100 may be disposed at the upper edge part PA1.

The electronic component unit 100 is disposed at a position that is relatively closer to the window V than the edge of the door body 70, 80, 90 so that the electronic component unit 100 and the edge of the door body 70, 80, 90 are spaced apart from each other. Accordingly, the electronic component unit 100 may remain supported and fixed to the door panel G, more specifically, the front panel Ga. For example, the electronic component unit 100 may be fixed to on a surface of the front panel Ga by using an adhesive part such as an adhesive tape.

Figure 8:
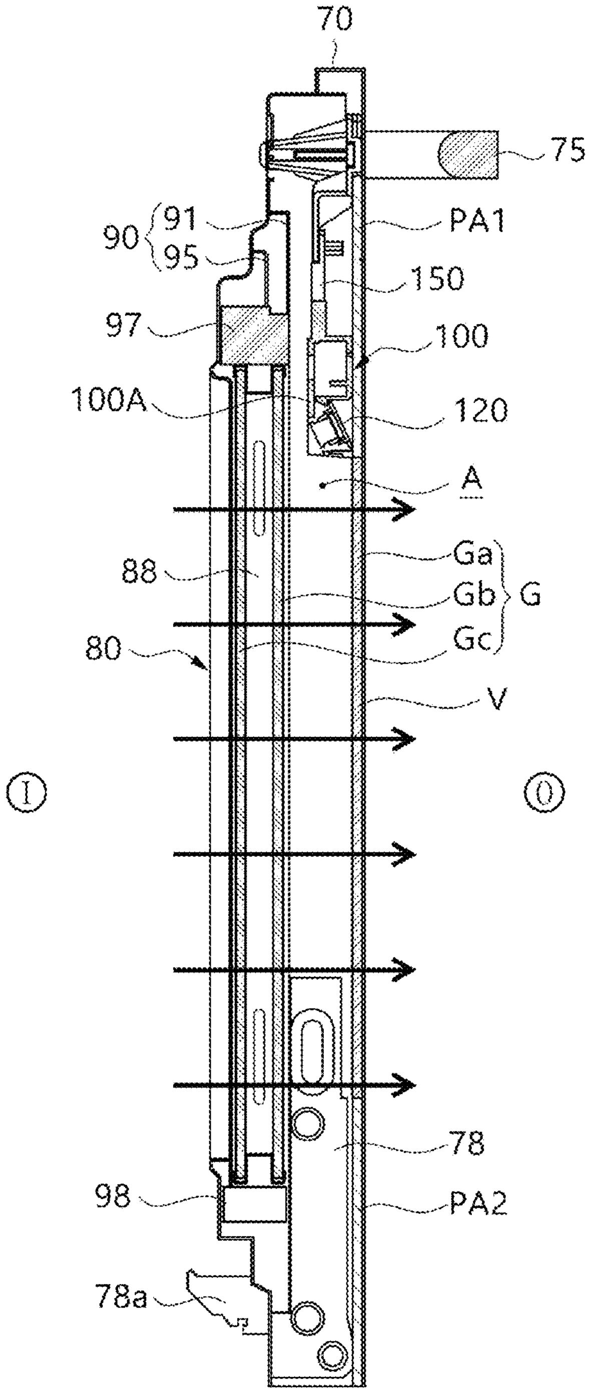
FIG. 8 is a sectional view taken along line VIII-VIII' of FIG. 3.

As shown in FIG. 8, arrows show transmittance of light from the rear side of the door 60 toward the front side. The front side may be the outside space of the home appliance, i.e., a direction toward the user. At this point, the front panel Ga of the door 60 includes the panel edge unit PA together with the window V, so light be may transmitted only through the window V. The panel edge unit PA consists of the printed layer 140 to be described below, and it is possible to prevent light transmission or to significantly reduce an amount of light transmittance.

As shown in FIG. 9, the window V of the front panel Ga constituting the door 60 may allow light to be transmitted therethrough, but the panel edge unit PA disposed around the window V may prevent light transmittance. In FIG. 9, the upper edge part PA2 among the panel edge unit PA. Since the electronic component unit 100 is disposed on the rear surface GaB of the upper edge part PA2, the upper edge part PA2 may cover the electronic component unit 100 to prevent the electronic component unit 100 from being exposed forward.

In the embodiment, the storage space 41 is made of a metal material and has a high light reflectance. Furthermore, the inner frame 90 and the rear frame 80 which are disposed behind the front panel Ga may also reflect light well. However, the panel edge unit PA blocks light and thus the reflected light may be transmitted forward only through the window V.

Figure 10:
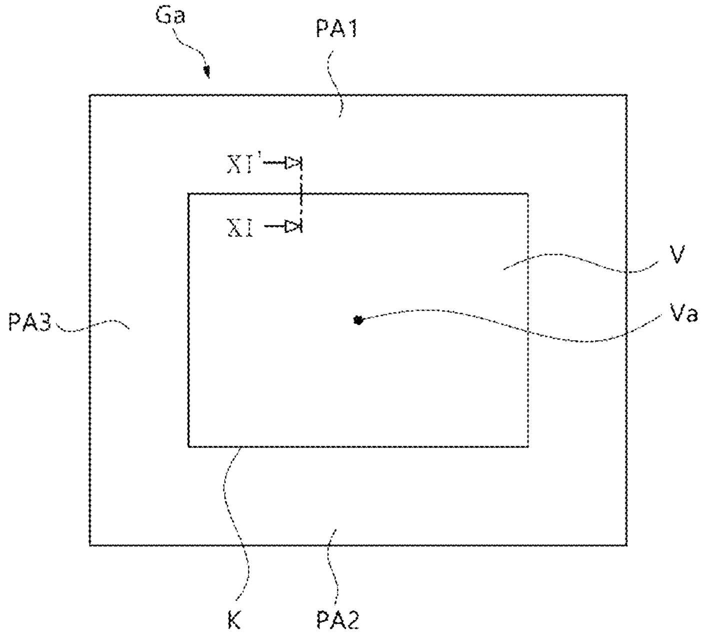
FIG. 10 is a rear view schematically showing a structure of a front panel constituting an embodiment according to the door for a home appliance of the present disclosure.

FIG. 10 is a simplified view of the front panel Ga. For reference, FIG. 10 shows the rear surface GaB of the front panel Ga. As shown in the drawing, the panel edge unit PA is formed around the window V. The panel edge unit PA may be formed by printing a material with a low light transmittance on a surface of a parent material of the front panel Ga. In other words, the panel edge unit PA is formed of the same parent material with the window V and formed by printing a particular color of paint as a post-processing.

The reference numeral K indicates a boundary part K between the window V and the panel edge unit PA. Based on the boundary part K, the window V and the panel edge unit PA are divided. The boundary part K may have a rectangular form along the perimeter of the window V. As another example, the boundary part K may have a polygonal form or a circular form.

Figure 11:
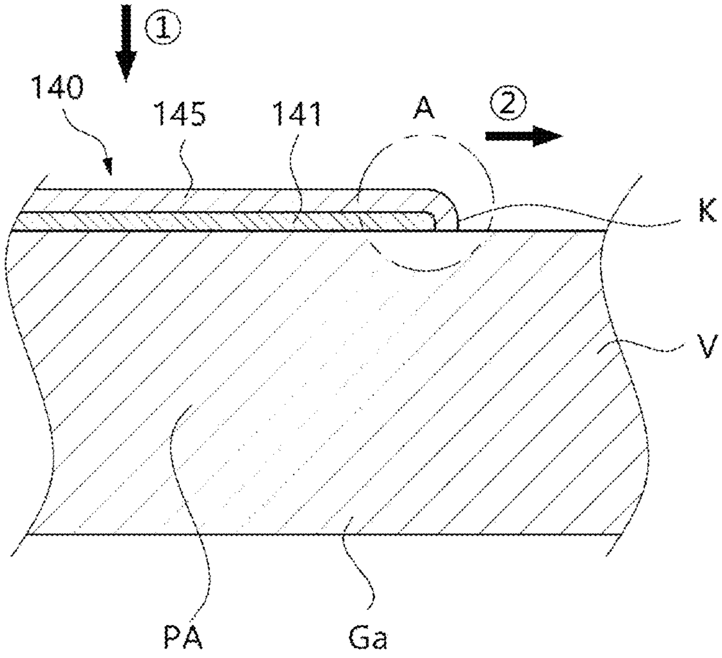
FIG. 11 is a sectional view taken along line XI-XI' of FIG. 10.

FIG. 11 is a sectional view enlarging and showing the boundary part K. As shown in the drawing, the window V and the panel edge unit PA may be divided according to whether or not the printed layer 140 formed in the panel edge unit PA is formed. The printed layer 140 is formed on the surface of the panel edge unit PA, and the printed layer 140 is omitted in the window V. As another example, the window V may also have the printed layer 140, but the printed layer 140 of the window V may have a higher light transmittance than the printed layer 140 of the panel edge unit PA.

In FIG. 11, the arrow (1) indicates a direction where a light of the storage space 41 is transmitted to the outside space of the door 60. The arrow (2) indicates a direction toward the central portion V' of the window V. The light reflected outward from the storage space 41 is transmitted only through the window V. As another example, a part of the light may be transmitted to the outside space through the panel edge unit PA, but a transmittance of the light may be much lower than a light transmittance of the window V.

Figure 12:
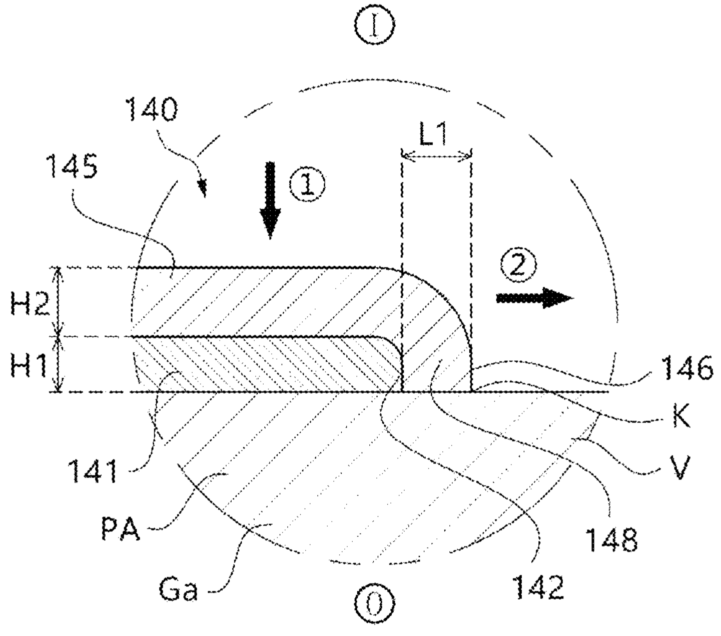
FIG. 12 is a sectional view enlarging and showing part A of FIG. 11.

As shown in FIG. 12 enlarging and showing part A of FIG. 11, a structure of the printed layer 140 will be shown in detail. As shown in the drawing, the printed layer 140 includes a first printed layer 141 formed on the surface of the door panel G. A second printed layer 145 is stacked on the first printed layer 141. The first printed layer 141 and the second printed layer 145 may be respectively printed on the front panel Ga.

The front panel Ga may be made of a glass member. The front panel Ga has a certain thickness and an area corresponding to the width A of the door 60. For example, the front panel Ga is made of safety glass or heat-strengthened glass with a thickness between 2 and 12 mm to prevent a risk element such as breakage.

The first printed layer 141 and the second printed layer 145 may be respectively printed by a silk-screen printing method, etc. The silk-screen printing is called a screen process, and performed by preparing a screen by stretching a silk or a chemical fiber cloth, covering a non-painted part with a mold paper or a glue, and then applying ink to the screen to allow the ink to pass through the screen so that only a printed part is printed.

As another example, the first printed layer 141 and the second printed layer 145 are formed by a printing method selected from a group consisting of offset printing, gravure printing, flexographic printing, or inkjet printing.

The first printed layer 141 and the second printed layer 145 can be printed by a 2-color printing method, where the first printed layer 141 and the second printed layer 145 are printed in different colors. For example, the first printed layer 141 may be printed so as to have a pearl-like texture, and the second printed layer 145 may be printed in a darker color, such as black or gray.

At this point, one end portion of the first printed layer 141 and one end portion of the second printed layer 145 does not match with each other. Specifically, the first printed layer 141 and the second printed layer 145 are printed with a predetermined time gap, including a drying time, and the first printed layer 141 and the second printed layer 145 may not be printed with precise sizes and positions. The overlap width of the first printed layer 141 and the second printed layer 145 may then be uneven at an end portion of the printed layer 140, and light of the storage space 41 leaks through the end portion of the printed layer 140. The brightness of the light leaking through the end portion of the printed layer 140 is also uneven, which may decrease the aesthetic of the home appliance.

In the embodiment, this problem can be solved by the second printed layer 145 covering an edge 142 of the first printed layer 141. The second printed layer 145 extends further in a direction toward a central portion V' of the window V than the first printed layer 141 to cover the inner edge 142 of the first printed layer 141. At this point, the inner edge 142 of the first printed layer 141 may be a portion of the first printed layer 141 that protrudes most toward the window V. In other words, an inner edge 146 of the second printed layer 145 is formed between the central portion V' of the window V and the inner edge of the first printed layer 141.

As shown in FIG. 12, the edge 146 of the second printed layer 145 extends further in toward the central portion of the window (direction of arrow (2)) than the edge 142 of the first printed layer 141. Accordingly, the edge 142 of the first printed layer 141 may be completely covered inside the edge 146 of the second printed layer 145. More specifically, the second printed layer 145 may be provided between the surface of the front panel Ga and the second printed layer 145.

As described above, when the second printed layer 145 covers the inner edge 142 of the first printed layer 141, an extending end part 148 is formed on one end portion of the second printed layer 145. The extending end part 148 may be considered as a portion that covers the inner edge 142 of the first printed layer 141. The extending end part 148 may be considered to divide the boundary part K. In the embodiment, the extending end part 148 may cover the inner end portion of the first printed layer 141 with an even width (a left-right directional width based on FIG. 12).

The extending end part 148 covers the inner edge 142 of the first printed layer 141 so as to prevent light from leaking through the boundary part K. The first printed layer 141 and the second printed layer 145 may have materials of different light transmittances. Preferably, the second printed layer 145 is printed with a material of a lower light transmittance than the first printed layer 141. This forms the boundary part K by the extending end part 148 of the second printed layer 145 having a relatively light transmittance, and prevents light from leaking through the boundary part K. For example, the first printed layer 141 may be composed of a paint mixed with particles composed of a compound of pearl or metallic polymers, i.e., particles that are reflected by light. The second printed layer 145 may be a paint with a color that can block light, such as gray or black.

The extending end part 148 may be continuously formed around the perimeter of the window V. When the extending end part 148 is continuously formed around the inner perimeter of the window V, the extending end part 148 may prevent light from penetrating at the boundary part K and provide a unified aesthetic.

As shown in FIG. 12, a width L1 of the extending end part 148 extending toward the central portion V' of the window V may range from 0.3 mm to 1.5 mm. When the width L1 of the extending end part 148 is less than 0.3 mm, the extending end part 148 is more likely to invade the inner edge 142 of the first printed layer 141. On the other hand, when the width L1 of the extending end part 148 is greater than 1.5 mm, the width of the extending end part 148 extending into the first printed layer 141 is increased, and an area where a 2-color printing colors of the first printed layer 141 and the second printed layer 145 is uneven widens, and the area of the window V narrows.

The thickness H2 of the second printed layer 145 may be thicker than the thickness H1 of the first printed layer 141. At this point, the thickness may be a height in a direction where the first printed layer 141 and the second printed layer 145 are stacked on the surface of the front panel Ga. The first printed layer 141 is exposed in a direction toward the front space of the home appliance, i.e., a direction toward the user, so the first printed layer 141 is intended to increase the aesthetic of the door 60. Otherwise, the second printed layer 145 is not exposed toward the storage space 41, i.e., toward the user, so the second printed layer 145 is intended to prevent light of the storage space 41 from penetrating rather than increase the aesthetic of the door 60. Therefore, the thickness H2 of the second printed layer 145 may be preferably thicker than the thickness H1 of the first printed layer 141.

In the embodiment, the panel edge unit PA is formed on the rear surface of the door panel G toward the storage space 41. At this point, the door panel G is the front panel Ga. Accordingly, the front surface of the front panel Ga toward the user may maintain a smooth surface with a certain thickness.

Meanwhile, although not shown in the drawing, a surface vacuum-evaporation layer stacked on the panel edge unit PA and the window V may be provided on the surface of the door panel G. The surface vacuum-evaporation layer may be formed by depositing a metal material on the surface of the door panel G. Specifically, vacuum-evaporation is a method of heating to a high temperature, evaporating the metal, and adhering the vapor as a thin film of the metal, and the method is performed in a vacuum. The metal thin film of a uniform thickness may be realized using vacuum-evaporation. The surface vacuum-evaporation layer may be formed by evaporating different materials 3 to 5 times to achieve the desired color. For example, indium is deposited and then silicon oxide ($SiO_2$) is deposited to achieve a silver color, and indium is deposited and then silicon oxide ($SiO_2$), titanium oxide ($TiO_2$), and aluminum oxide ($Al_2O_3$) are deposited to achieve a gold color.

The surface vacuum-evaporation layer may allow the front panel Ga to have the same characteristics as a kind of half glass. The surface vacuum-evaporation layer may be formed on the rear surface of the front panel Ga by vacuum-evaporation of titanium compound ($TiO_2$). In other words, the surface vacuum-evaporation layer is formed in the entire rear surface GaB of the front panel Ga. When the lighting device 130 is not turned on, the surface vacuum-evaporation layer reflects light, and the front panel Ga viewed from the front space may look like a mirror.

The surface vacuum-evaporation layer may allow external light to be reflected on the surface of the door panel G. The surface vacuum-evaporation layer reflects the external light with the front panel Ga to prevent the external light from being transmitted into the door 60. This may prevent the external light from being transmitted into the door 60, reflected on the rear panel IP, and then transmitted to the camera device 120. Therefore, it is possible to prevent the camera device 120 from not obtaining an accurate image due to interference with light introduced from the outside space. Furthermore, since the surface vacuum-evaporation layer reflects external light, it is possible to prevent the figure of the user located in front of the home appliance from being projected into the door and photographed by the camera device 120.

The electronic component unit 100 may be disposed in the second printed layer 145. As shown in FIG. 9, the entire electronic component unit 100 is disposed behind the panel edge unit PA where the second printed layer 145 is formed. Accordingly, the second printed layer 145 may cover the electronic component unit 100 so that the electronic component unit 100 is not exposed forward. Specifically, the lighting device 130 of the electronic component unit 100 of the present disclosure emits strong light, and the second printed layer 145 prevents not only light emitted from the lighting device 130 and reflected on the inner wall of the storage space 41, but also light of the lighting device 130 from being directly exposed forward (rightward direction in FIG. 9).

More specifically, the electronic component unit 100 includes the lighting device 130 that emits light in the direction where the first printed layer 141 and the second printed layer 145 are stacked together. When the lighting device 130 emits light in the direction where the first printed layer 141 and the second printed layer 145 are stacked on each other (leftward direction in FIG. 9), since the two printed layers 140 block the light reflected from the inner frame 90, etc., the amount of light leaking forward can be reduced.

Figure 13:
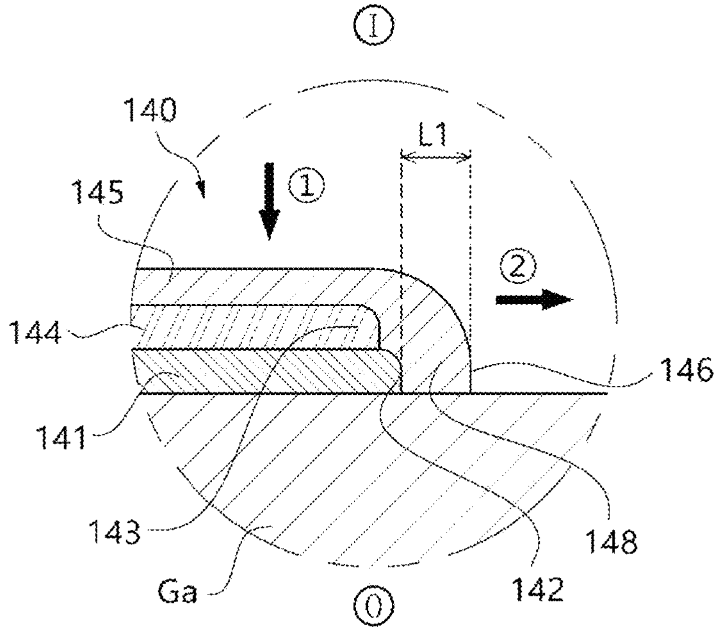
FIGS. 13 (A) and (B) are sectional views enlarging and showing a panel edge unit of the front panel forming a second embodiment according to the door for a home appliance of the present disclosure.
Figure 13:
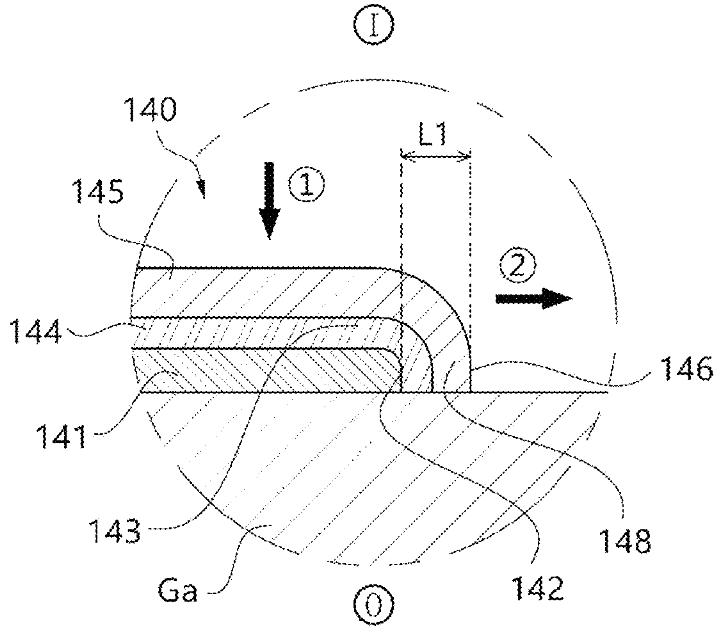

FIG. 13 shows the printed layer 140 constituting another embodiment of the present disclosure. Components that are identical to the preceding embodiments will be given with the same reference numerals and will not be described. First, as shown in FIG. 13A, in the embodiment, an additional printed layer 143 may be formed between the first printed layer 141 and the second printed layer 145. One or more additional printed layers 143 may be provided. When the additional printed layer 143 is added, the printed layer 140 may be realized in a printing method of 3-color printing or more.

The inner edge 146 of the second printed layer 145 covers the inner edge of the first printed layer 141 and an inner edge of the additional printed layer 143. The edge 144 of the additional printed layer 143 does not cover the inner edge 142 of the first printed layer 141, but the edge 146 of the second printed layer 145 covers both the inner edges 142 and 144 of the first printed layer 141 and the additional printed layer 143.

As shown in FIG. 13B, in the embodiment, the additional printed layer 143 may be formed between the first printed layer 141 and the second printed layer 145. One or more additional printed layers 143 may be provided. When the additional printed layer 143 is added, the printed layer 140 may be realized in a printing method of 3-color printing or more.

The inner edge 146 of the second printed layer 145 covers the inner edge of the first printed layer 141 and an inner edge of the additional printed layer 143. At this point, the inner edge 144 of the additional printed layer 143 may also cover the inner edge 142 of the first printed layer 141. Furthermore, the edge 146 of the second printed layer 145 may cover both the inner edges 142 and 144 of the first printed layer 141 and the additional printed layer 143. Eventually, the inner edge 142 of the first printed layer 141 may be covered with both the additional printed layer 143 and the second printed layer 145.

Figure 14:
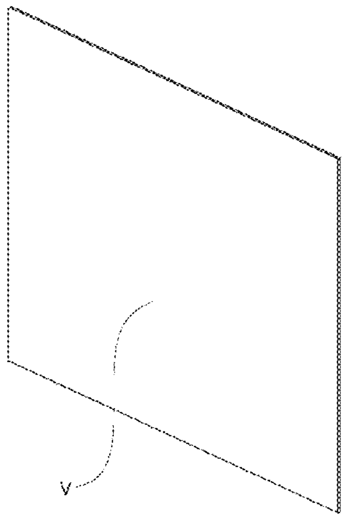
FIGS. 14 to 18 are sequence views showing a process of manufacturing the embodiment of the door for a home appliance of the present disclosure.

FIGS. 14 to 18 are sequence views showing a process of manufacturing the door according to the embodiment of the present disclosure. First, FIG. 14 shows a glass material forming the front panel Ga. The printed layer 140 should be formed on the rear surface of the front panel Ga, so the window and the panel edge unit PA are not divided from each other before the printed layer 140 is printed.

Figure 15:
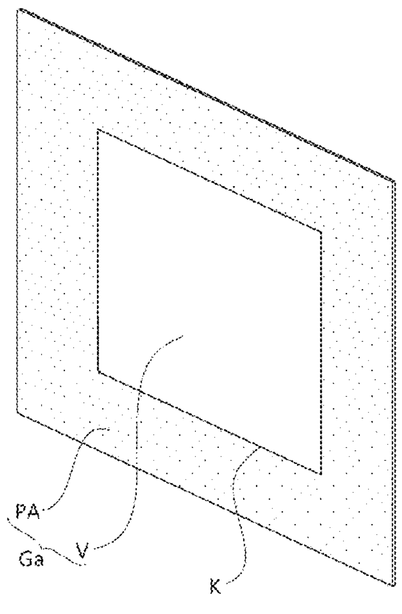

FIG. 15 shows the first printed layer 141 printed on the front panel Ga. As shown in the drawing, the first printed layer 141 may be printed in a roughly rectangular form around the perimeter of the window. The first printed layer 141 may be printed in a screen process as described above. In the embodiment, a paint of pearl material that may transmit light to some extent may be used for the printing of the first printed layer 141.

Figure 16:
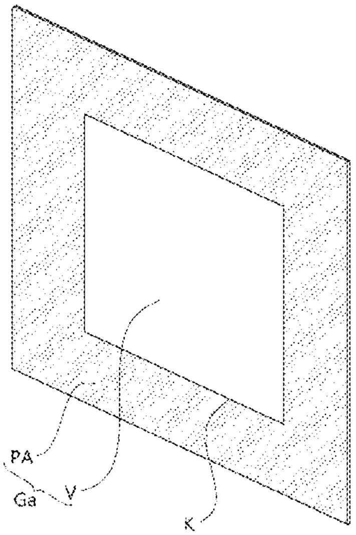

FIG. 16 shows the second printed layer 145 printed on the front panel Ga. The second printed layer 145 may cover the previously printed first printed layer 141. The second printed layer 145 may be printed in a roughly rectangular form around the perimeter of the window, like the first printed layer 141. The second printed layer 145 may also be printed in the screen process. In the embodiment, a paint of black or gray through which light can be transmitted is used to print the second printed layer 145.

At this point, as described above, the inner edge 146 of the second printed layer 145 may extend further toward the central portion V' of the window V than the inner edge 142 of the first printed layer 141. As described above, since there is no need to match the inner edge 142 of the first printed layer 141 and the inner edge 146 of the second printed layer 145, the printing process can be easily performed, the extending end part 148 of the second printed layer 145 prevents light transmission to increase the aesthetic of the door 60.

When the second printed layer 145 is formed, the surface vacuum-evaporation layer may be formed on the entire rear surface of the front panel Ga. Through the vacuum-evaporation process, when the surface vacuum-evaporation layer is formed on the entire rear surface of the front panel Ga, surface treatment of the front panel Ga is completed. As another example, the surface vacuum-evaporation layer may be omitted.

Figure 17:
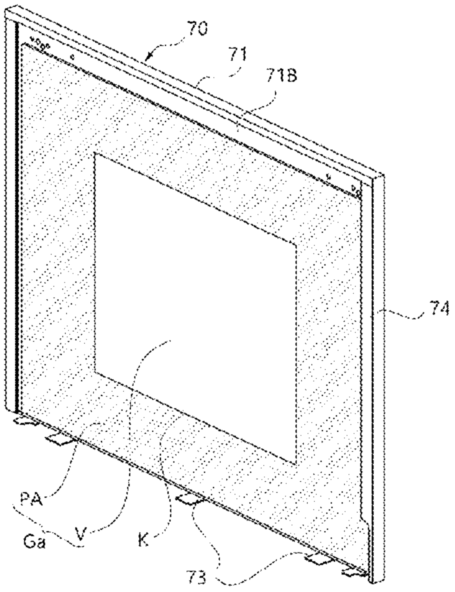
Figure 18:
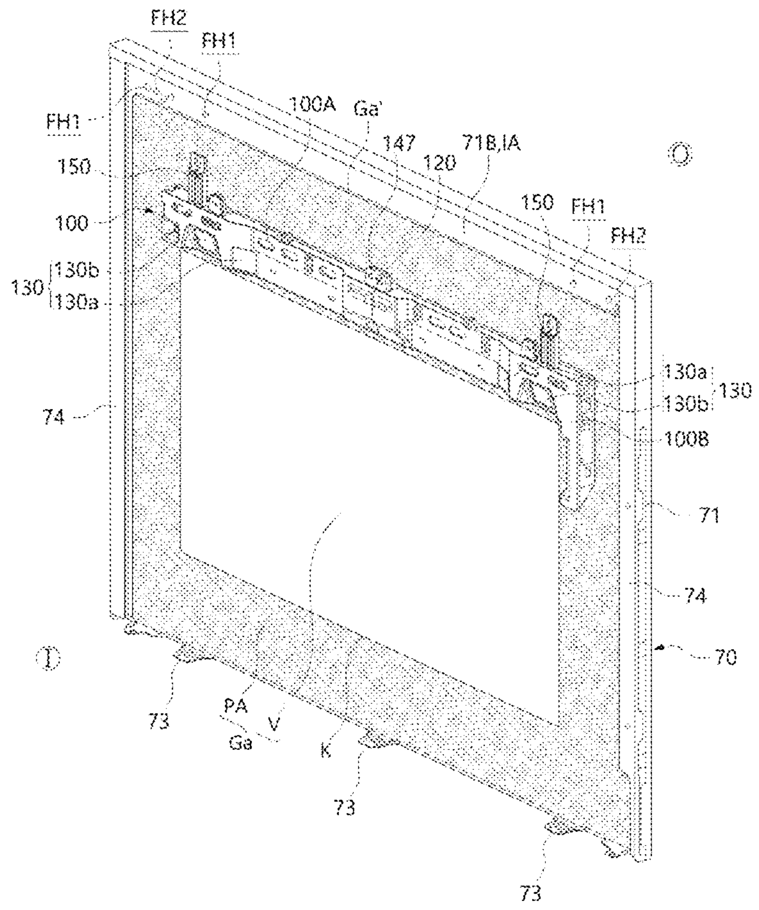

FIG. 17 shows the front panel Ga coupled to the front frame 70 after completing printing. The front panel Ga is fixed to the front frame 70 in an adhesive method. Finally, as shown in FIG. 18, the electronic component unit 100 is disposed in the panel edge unit PA. When the electronic component unit 100 is disposed in the panel edge unit PA, the printed layer 140 prevents the electronic component unit 100 from being exposed forward.

Although the preferred embodiments of the present disclosure have been described for illustrative purposes, those skilled in the art will appreciate that various modifications, additions and substitutions are possible, without departing from the scope and spirit of the present disclosure as disclosed in the accompanying claims. Therefore, the preferred embodiments described above have been described for illustrative purposes, and should not be intended to limit the technical spirit of the present disclosure, and the scope and spirit of the present disclosure are not limited to the embodiments. The protective scope of the present disclosure should be interpreted by the accompanying claims, and all technical spirits within the equivalent scope should be interpreted as being included in the scope and spirit of the present disclosure.

What is claimed is:

1. A door for a home appliance, the door comprising:
a door body disposed in front of a storage space of the home appliance; and
a door panel coupled to the door body,
wherein the door panel comprises:
a window through which light in the storage space is transmitted; and
a panel edge portion surrounding a perimeter of the window and having a printed layer formed on a surface of the door panel,
wherein the printed layer comprises:
a first printed layer formed on the surface of the door panel having a first inner edge that faces a central portion of the window, and
a second printed layer stacked on the first printed layer, and extending further in a direction toward the central portion of the window than the first printed layer to cover the inner edge of the first printed layer.

2. The door for a home appliance of claim 1, wherein the first printed layer and the second printed layer are respectively formed by printing materials having different light transmittances on the surface of the door panel.

3. The door for a home appliance of claim 1, wherein the second printed layer is formed by printing a material having a light transmittance lower than a light transmittance of the first printed layer.

4. The door for a home appliance of claim 1, wherein, based on a direction where the first printed layer and the second printed layer are stacked on each other, the thickness of the second printed layer is thicker than the thickness of the first printed layer.

5. The door for a home appliance of claim 1, wherein the panel edge unit is provided on a rear surface of the door panel, the surface facing the storage space.

6. The door for a home appliance of claim 1, wherein a surface vacuum-evaporation layer is provided on the surface of the door panel and stacked on both the panel edge portion and the window, and
the surface vacuum-evaporation layer is formed by depositing a metal material on the surface of the door panel.

7. The door for a home appliance of claim 1, wherein an edge of the second printed layer comprises an extending end part that protrudes further in a direction toward the central portion of the window than an edge of the first printed layer.

8. The door for a home appliance of claim 7, wherein the extending end part is continuously formed around a perimeter of the window.

9. The door for a home appliance of claim 7, wherein a width of the extending end part extending in a direction toward the central portion of the window ranges from 0.3 mm to 1.5 mm.

10. The door for a home appliance of claim 1, wherein one or more additional printed layers are provided between the first printed layer and the second printed layer, and
an inner edge of the second printed layer covers both the inner edge of the first printed layer and an inner edge of the additional printed layer.

11. The door for a home appliance of claim 10, wherein the inner edge of the additional printed layer is formed to cover the inner edge of the first printed layer.

12. The door for a home appliance of claim 1, wherein an electronic component unit is disposed in the second printed layer.

13. The door for a home appliance of claim 12, wherein the electronic component unit comprises a lighting device that emits light in a direction where the first printed layer and the second printed layer are stacked on each other.

14. The door for a home appliance of claim 1, wherein the panel edge portion is continuously formed around the perimeter of the window.

15. A home appliance comprising the door of claim 1.

16. A door for a home appliance, the door comprising:

a door body disposed in front of a storage space of the home appliance;

a door panel coupled to the door body;

a window formed at a central portion of the door panel and through which light in the storage space is transmitted; and a panel edge portion formed on a surface of the door panel around the window, wherein the panel edge portion includes:

a first printed layer printed along a perimeter of the window and having a first inner edge that faces toward a central portion of the window, and a second printed layer printed to be stacked on the first printed layer, and having a second inner edge that is formed between the central portion of the window and the first inner edge of the first printed layer.

17. The door for a home appliance of claim 16, wherein the first printed layer and the second printed layer are respectively formed by printing materials having different light transmittances, on the surface of the door panel.

18. The door for a home appliance of claim 16, wherein the second printed layer is formed by printing a material having a light transmittance lower than a light transmittance of the first printed layer.

19. The door for a home appliance of claim 16, wherein, based on a direction where the first printed layer and the second printed layer are stacked on each other, the thickness of the second printed layer is thicker than the thickness of the first printed layer.

20. The door for a home appliance of claim 16, wherein the panel edge portion is provided on a rear surface of the door panel, the surface facing the storage space.

* * * * *